United States Patent
Balraj et al.

(10) Patent No.: US 11,552,817 B2
(45) Date of Patent: *Jan. 10, 2023

(54) SYSTEMS AND METHODS FOR INDOOR TRACKING VIA WI-FI FINGERPRINTING AND ELECTROMAGNETIC FINGERPRINTING

(71) Applicant: Honeywell International Inc., Charlotte, NC (US)

(72) Inventors: KamalaKannan Balraj, Madurai (IN); Sunil Venugopalan, Bangalore (IN); SivaKumar Balla, Madurai (IN); Ramkumar Rajendran, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/354,553

(22) Filed: Jun. 22, 2021

(65) Prior Publication Data

US 2021/0320813 A1    Oct. 14, 2021

Related U.S. Application Data

(63) Continuation of application No. 16/006,049, filed on Jun. 12, 2018, now Pat. No. 11,075,776.
(Continued)

(51) Int. Cl.
*H04L 12/28*    (2006.01)
*H04W 4/33*    (2018.01)
(Continued)

(52) U.S. Cl.
CPC ........ *H04L 12/2829* (2013.01); *G01S 5/0252* (2013.01); *G01S 11/06* (2013.01);
(Continued)

(58) Field of Classification Search
CPC ....... H04W 64/00; H04W 4/021; H04W 4/33; H04W 4/029; H04W 64/003;
(Continued)

(56) References Cited

U.S. PATENT DOCUMENTS 9,341,700 B2    5/2016 Amir et al.
2012/0072106 A1    3/2012 Han et al.
(Continued)

FOREIGN PATENT DOCUMENTS

AU    2013100137 A4    3/2013
CN    105934684 A    9/2016

*Primary Examiner* — Ajibola A Akinyemi
(74) *Attorney, Agent, or Firm* — Seager, Tufte & Wickhem, LLP

(57) ABSTRACT

Systems and methods for indoor tracking via Wi-Fi fingerprinting and electromagnetic fingerprinting are provided and can include a gateway receiver device measuring a RSSI value of a signal transmitted by a Wi-Fi transmitter device, the gateway receiver device measuring an EMF value of an interference in an electromagnetic field created by the gateway receiver device that is caused by the Wi-Fi transmitter device, the gateway receiver device determining whether the RSSI value matches any of a plurality of Wi-Fi fingerprints associated with a monitored region and whether the EMF value matches any of a plurality of electromagnetic fingerprints associated with the monitored region, and responsive thereto, the gateway receiver device identifying that a location of the Wi-Fi transmitter device is within the monitored region.

20 Claims, 1 Drawing Sheet

Related U.S. Application Data

(60) Provisional application No. 62/518,763, filed on Jun. 13, 2017.

(51) Int. Cl.
  *H04W 64/00* (2009.01)
  *G01S 11/06* (2006.01)
  *H04W 4/02* (2018.01)
  *G01S 5/02* (2010.01)

(52) U.S. Cl.
  CPC ............ *H04W 4/023* (2013.01); *H04W 4/33* (2018.02); *H04W 64/003* (2013.01)

(58) Field of Classification Search
  CPC ..... H04W 4/023; H04W 84/12; H04W 24/10; H04W 24/08; H04W 4/80; H04W 4/02; H04W 12/086; H04W 4/022; H04W 4/025; H04W 64/006; H04W 8/26
  USPC ........................................................ 700/276
  See application file for complete search history.

(56) References Cited

U.S. PATENT DOCUMENTS

| | | | |
|---|---|---|---|
| 2012/0127980 A1* | 5/2012 | Quinn | H04W 8/005 370/338 |
| 2014/0018111 A1 | 1/2014 | Farley et al. | |
| 2014/0180627 A1 | 6/2014 | Naguib et al. | |
| 2015/0087331 A1 | 3/2015 | Yang et al. | |
| 2015/0348341 A1* | 12/2015 | Baxley | H04W 12/12 340/5.2 |
| 2016/0007270 A1* | 1/2016 | Maor | H04W 4/80 455/434 |
| 2016/0116290 A1 | 4/2016 | Haverinen et al. | |
| 2016/0359526 A1* | 12/2016 | Pellew | H04B 17/318 |
| 2017/0067982 A1 | 3/2017 | Pan et al. | |
| 2017/0118686 A1* | 4/2017 | Fang | H04W 36/08 |
| 2017/0149486 A1* | 5/2017 | Hara | H04B 7/15528 |
| 2018/0100664 A1* | 4/2018 | Keogh | G05B 19/048 |

\* cited by examiner

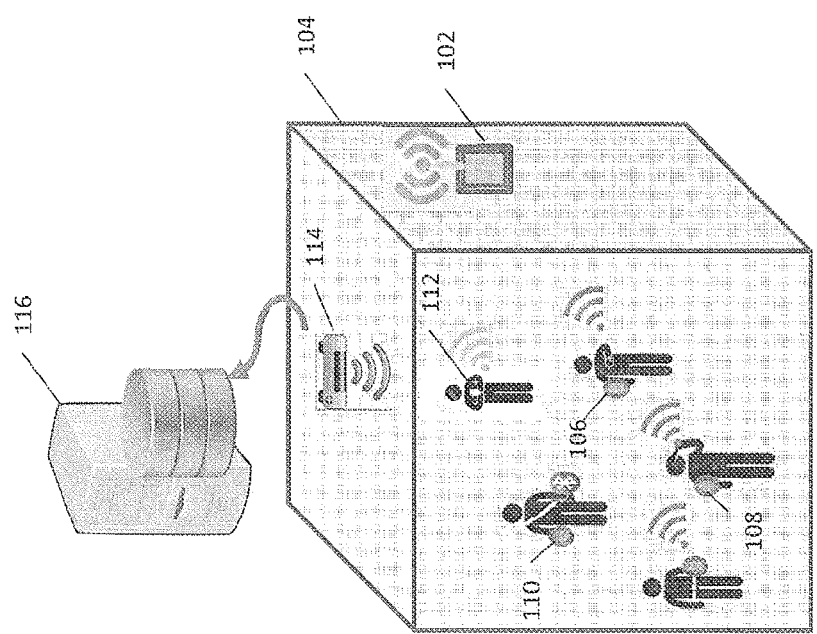

SYSTEMS AND METHODS FOR INDOOR TRACKING VIA WI-FI FINGERPRINTING AND ELECTROMAGNETIC FINGERPRINTING

CROSS-REFERENCE TO RELATED APPLICATIONS

This is a continuation of co-pending U.S. patent application Ser. No. 16/006,049, filed Jun. 12, 2018, entitled "SYSTEMS AND METHODS FOR INDOOR TRACKING VIA WI-FI FINGERPRINTING AND ELECTROMAGNETIC FINGERPRINTING", which claims priority to U.S. Provisional Patent Application No. 62/518,763 filed Jun. 13, 2017 and entitled "SYSTEMS AND METHODS FOR INDOOR TRACKING VIA A WI-FI FINGERPRINT AND AN ELECTROMAGNETIC FENCE", both of which are incorporated herein by reference.

FIELD

The present invention relates to systems and methods for indoor tracking. More particularly, the present invention relates to systems and methods for indoor tracking via Wi-Fi fingerprinting and electromagnetic fingerprinting.

BACKGROUND

Indoor tracking systems and methods are known in the art and are based on RF fingerprints, transliteration, and time of arrival (TOA). However, known systems and methods are vulnerable to external interference, thereby resulting in inconsistent accuracy. For example, it is difficult to accurately track a position of a person or an object when RF signals are used and those RF signals overlap or encounter interference, such as iron materials, walls, or other objects that affect signal strength.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for indoor tracking via Wi-Fi fingerprinting and electromagnetic fingerprinting. For example, embodiments disclosed herein can include a hybrid methodology using both Wi-Fi fingerprinting and electromagnetic fingerprinting that can be used to track people or objects and that can be used in connection with any location-based service as would be known by one of skill in the art, for example, connecting and controlling interne of things (IoT) devices that are connected via Wi-Fi and that are part of a connected home, building, office, hospital, or commercial system.

In accordance with disclosed embodiments, systems and methods disclosed herein can include a gateway receiver device in a monitored region, and in some embodiments, the gateway receiver device can include a Wi-Fi transceiver and an electromagnetic object that can create an electromagnetic fence or field. For example, the gateway receiver device can use the Wi-Fi transceiver and a plurality of Wi-Fi devices placed at appropriate distances from the gateway receiver device at boundaries of the monitored region to measure and map a plurality of Wi-Fi fingerprints associated with the monitored region. Similarly, the gateway receiver device can use the electromagnetic object and a plurality of electromagnetic devices placed at appropriate distances from the gateway receiver device at boundaries of the monitored region to measure and map a plurality of electromagnetic fingerprints associated with the monitored region. Then, the gateway receiver device can store the plurality of Wi-Fi fingerprints and the plurality of electromagnet fingerprints in a database device of a local or remote server device to generate a mapping table for the monitored region.

As disclosed herein, it is to be understood that a Wi-Fi fingerprint can include a received signal strength indicator (RSSI) value indicative of a power of a received radio signal, such as a Wi-Fi signal, from a Wi-Fi device and measured by the gateway receiver device. Furthermore, as disclosed herein, it is also to be understood that an electromagnetic fingerprint can include an electromagnetic fence or field (EMF) value indicative of interference in the electromagnetic fence or field (in Gauss units) caused by an electromagnetic device and measured by the gateway receiver device. In this regard, it is to be understood that the electromagnetic fence or field can describe a physical field produced by an electrically charged object that can affect the behavior of charged objects within a vicinity of the electromagnetic fence or field. The electromagnetic fence or field can extend throughout space and can describe the electromagnetic interaction of objects. In some embodiments, such vicinity field properties of the electromagnetic fence or field (i.e. the EMF value) can be used by systems and methods disclosed herein to avoid Wi-Fi signals overlapping and to avoid signal path loss issues, thereby overcoming the inconsistent accuracy issues of known systems and methods.

In accordance with disclosed embodiments, systems and methods disclosed herein can also include a Wi-Fi transmitter device, which can include or be a part of, for example, a wearable device worn by people or objects. When the Wi-Fi transmitter device is within a range of the gateway receiver device, the gateway receiver device can use the Wi-Fi transceiver to measure the RSSI value of a signal transmitted by the Wi-Fi transmitter device and can use the electromagnetic object to measure to measure the EMF value of the interference in the electromagnetic field or fence caused by the Wi-Fi transmitter. Then, the gateway receiver device can use such measured RSSI and EMF values to determine whether the Wi-Fi transmitter device is within the monitored region. For example, the gateway receiver device can transmit the measured RSSI and EMF values to the local or remote server device, which can compare the measured RSSI and EMF values to the plurality of Wi-Fi fingerprints and the plurality of electromagnetic fingerprints stored in the database and associated with the monitored region to determine whether the measured RSSI and EMF values match any of the plurality of Wi-Fi fingerprints and any of the plurality of electromagnetic fingerprints. In some embodiments, the gateway receiver device can use the measured RSSI and EMF values as disclosed to identify a location of the Wi-Fi transmitter within the monitored region.

In some embodiments, systems and methods disclosed herein can support connecting and controlling IoT devices.

For example, a user can provide user input to the Wi-Fi transmitter device with instructions the gateway receiver device to adjust room temperature in an ambient room. Responsive thereto, the Wi-Fi transmitter device can transmit the signal to a central system of an HVAC system via the gateway receiver. The gateway receiver device in the ambient room can receive the signal from the Wi-Fi transmitter device, measure the RSSI and EMF values, and transmit such data to the server device. Then, the server device can use such received data as disclosed herein to identify a current location of the Wi-Fi transmitter device and, thus, the user, prior to authorizing the gateway receiver device and the HVAC system to adjust the room temperature as instructed.

FIG. 1 is a block diagram of a system 100 in accordance with disclosed embodiments. As shown in FIG. 1, the system 100 can include a gateway receiver device 102 in a zone, a room, or a monitored region 104. The system 100 can also include Wi-Fi transmitter devices 106-112 associated located in the zone, the room, or the monitored region 104. In some embodiments, some or all of the Wi-Fi transmitter devices 106-112 (e.g. the Wi-Fi transmitter devices 106 and 108) can include or be a part of a wearable device. Furthermore, in some embodiments, some or all of the Wi-Fi transmitter devices 106-112 (e.g. the Wi-Fi transmitter device 112) can include or be a part of a mobile device, such as a smartphone.

While the Wi-Fi transmitter devices 106-112 are described as wirelessly communicating with the gateway receiver device 102 via Wi-Fi (e.g. 802.11), it is to be understood that, additionally or alternatively, the Wi-Fi transmitter devices 106-112 can communicate with the gateway receiver module 102 via Bluetooth (BLE) or another wireless communication protocol. In these embodiments, the Wi-Fi transmitter devices 106-112 can be or include BLE transmitter devices or the like, and the gateway receiver device 102 can include a BLE-based transceiver.

The system 100 can also include a router 114 that connects to the Internet and facilitates the gateway receiver device 102 and the Wi-Fi transmitter devices 106-112 connecting with a server 116 via the Internet and the router 114. The server 116 can include a database that stores a plurality of Wi-Fi fingerprints associated with the zone, the room, or the monitored region 104 and a plurality of electromagnetic fingerprints associated with the zone, the room, or the monitored region 104.

Although not illustrated, it is to be understood that each of the gateway receiver device 102 and the server 116 can include control circuitry, which can include one or more programmable processors and executable control software as would be understood by one of ordinary skill in the art. The executable control software can be stored on a transitory or non-transitory computer readable medium, including, but not limited to local computer memory, RAM, optical storage media, magnetic storage media, and the like. In some embodiments, the control circuitry, the programmable processors, and the executable control software can execute and control some of the methods disclosed herein.

For example, the gateway receiver device 102 can measure a RSSI value of a signal transmitted by one of the Wi-Fi transmitter devices 106-112 and can measure an EMF value of interference in an electromagnetic fence or field created by the gateway receiver device 102 that is caused by the one of the Wi-Fi transmitter devices 106-112. Then, the gateway receiver device 102 can use such measured RSSI and EMF values to determine whether the one of the Wi-Fi transmitter devices 106-112 is within the zone, the room, or the monitored region 104. For example, the gateway receiver device 102 can transmit the measured RSSI and EMF values to the server 116, which can compare the measured RSSI and EMF values to the plurality of Wi-Fi fingerprints and the plurality of electromagnetic fingerprints stored in the database and associated with the monitored region to determine whether the measured RSSI and EMF values match any of the plurality of Wi-Fi fingerprints and any of the plurality of electromagnetic fingerprints and, if so, that the one of the transmitter devices 106-112 is within the zone, the room, or the monitored region 104.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method of controlling a building control device servicing a building space based at least in part on whether one or more individuals are in the building space, each of the one or more individuals carrying a wireless device with a wireless transmitter, the method comprising:
   determining an RSSI value of a signal transmitted by the wireless transmitter of the wireless device carried by one of the one or more individuals;
   creating an electromagnetic field in the building space;
   determining an EMF value that is indicative of an interference in the electromagnetic field, the interference in the electromagnetic field caused at least in part by the wireless device carried by the one of the one or more individuals;
   determining whether the RSSI value matches one or more of a plurality of wireless fingerprints associated with the building space;
   determining whether the EMF value matches one or more of a plurality of electromagnetic fingerprints associated with the building space;
   identifying that the wireless device carried by the one of the one or more individuals is within the building space and thus determining that the one of the one or more individuals is within the building space when the RSSI value matches one of the plurality of wireless fingerprints associated with the building space and the EMF value matches one of the plurality of electromagnetic fingerprints associated with the building space; and
   controlling the building control device based at least in part on whether the one of the one or more individuals is determined to be within the building space or not.

2. The method of claim 1 wherein the wireless transmitter of the wireless device carried by the one of the one or more individuals comprises a Wi-Fi transmitter, and the RSSI value corresponds to a Wi-Fi signal transmitted by the Wi-Fi transmitter.

3. The method of claim 1 wherein the wireless transmitter of the wireless device carried by the one of the one or more individuals comprises a Bluetooth transmitter, and the RSSI value corresponds to a Bluetooth signal transmitted by the Bluetooth transmitter.

4. The method of claim 1 further comprising transmitting the RSSI value and the EMF value to a server to determine whether the RSSI value matches any of the plurality of wireless fingerprints associated with the building space and whether the EMF value matches any of the plurality of electromagnetic fingerprints associated with the building space.

5. The method of claim 4 further comprising the server comparing the RSSI value to a plurality of wireless fingerprints associated with the building space and stored in a database on the server and comparing the EMF value to a plurality of electromagnetic fingerprints associated with the building space and stored in the database.

6. The method of claim 5 further comprising:
measuring and mapping at least some of the plurality of wireless fingerprints and storing the plurality of wireless fingerprints in the database; and
measuring and mapping at least some of the plurality of electromagnetic fingerprints and storing the plurality of electromagnetic fingerprints in the database.

7. The method of claim 1 further comprising:
receiving a control command for the building control device from the wireless transmitter of the wireless device carried by the one of the one or more individuals; and
instructing the building control device to execute the control command when the one of the one or more individuals is determined to be within the building space, and not instructing the building control device to execute the control command when the one of the one or more individuals is determined not to be within the building space.

8. The method of claim 7 wherein the building control device is part of an HVAC system, and wherein the control command includes instructions to raise or lower a temperature in the building space.

9. The method of claim 1 wherein the wireless device is a mobile device.

10. The method of claim 9 wherein the wireless device comprises a wearable device or a smartphone.

11. The method of claim 1 wherein the electromagnetic field extends throughout the building space and is used to identify an electromagnetic interaction with the wireless device carried by the one of the one or more individuals.

12. A method of controlling a building control device servicing a building space based at least in part on whether one or more individuals are in the building space, each of the one or more individuals carrying a wireless device with a wireless transmitter, the method comprising:
determining one or more characteristics of a signal transmitted by the wireless transmitter of the wireless device carried by one of the one or more individuals;
creating an electromagnetic field in the building space;
identifying one or more characteristics of an electromagnetic interaction between the electromagnetic field in the building space and the wireless device carried by the one of the one or more individuals;
determining whether the one or more characteristics of the signal transmitted by the wireless transmitter of the wireless device matches one or more of a plurality of wireless fingerprints associated with the building space;
determining whether the one or more characteristics of the electromagnetic interaction between the electromagnetic field in the building space and the wireless device matches one or more of a plurality of electromagnetic fingerprints associated with the building space;
identifying that the wireless device carried by the one of the one or more individuals is within the building space and thus determining that the one of the one or more individuals is within the building space when the one or more characteristics of the signal transmitted by the wireless transmitter of the wireless device matches one or more of the plurality of wireless fingerprints associated with the building space and the one or more characteristics of the electromagnetic interaction between the electromagnetic field in the building space and the wireless device matches one of the plurality of electromagnetic fingerprints associated with the building space; and
controlling the building control device based at least in part on whether the one of the one or more individuals is determined to be within the building space or not.

13. The method of claim 12 wherein the wireless transmitter of the wireless device carried by the one of the one or more individuals comprises a Wi-Fi transmitter, and the one or more characteristics of the signal transmitted by the wireless transmitter of the wireless device comprises an RSSI value of a Wi-Fi signal transmitted by the Wi-Fi transmitter.

14. The method of claim 12 wherein the wireless transmitter of the wireless device carried by the one of the one or more individuals comprises a Bluetooth transmitter, and the one or more characteristics of the signal transmitted by the wireless transmitter of the wireless device comprises an RSSI value of a Bluetooth signal transmitted by the Bluetooth transmitter.

15. The method of claim 12 further comprising:
receiving a control command for the building control device from the wireless transmitter of the wireless device carried by the one of the one or more individuals; and
instructing the building control device to execute the control command when the one of the one or more individuals is determined to be within the building space, and not instructing the building control device to execute the control command when the one of the one or more individuals is determined not to be within the building space.

16. The method of claim 15 wherein the building control device is part of an HVAC system, and wherein the control command includes instructions to raise or lower a temperature in the building space.

17. The method of claim 12 wherein the electromagnetic field extends throughout the building space and is used to create the electromagnetic interaction with the wireless device carried by the one of the one or more individuals.

18. A system for controlling a building control device servicing a building space based at least in part on whether one or more individuals are in the building space, each of the one or more individuals carrying a wireless device with a wireless transmitter, the system comprising:
an electromagnetic object configured to create an electromagnetic field in the building space;
a receiver configured to receive a signal transmitted by the wireless transmitter of the wireless device carried by one of the one or more individuals;
a controller configured to:
determine an RSSI value of the signal transmitted by the wireless transmitter of the wireless device;

determine an EMF value that is indicative of an interference in the electromagnetic field, the interference in the electromagnetic field caused at least in part by the wireless device carried by the one of the one or more individuals;

determine whether the RSSI value matches one or more of a plurality of wireless fingerprints associated with the building space;

determine whether the EMF value matches one or more of a plurality of electromagnetic fingerprints associated with the building space;

identify that the wireless device carried by the one of the one or more individuals is within the building space and thus determining that the one of the one or more individuals is within the building space when the RSSI value matches one of the plurality of wireless fingerprints associated with the building space and the EMF value matches one of the plurality of electromagnetic fingerprints associated with the building space; and control the building control device based at least in part on whether the one of the one or more individuals is determined to be within the building space or not.

19. The system of claim 18, wherein the controller is distributed among at least a gateway device at the building space and a server remote from the building space.

20. The system of claim 19, wherein the gateway device houses the electromagnetic object and the receiver.

* * * * *